Feb. 1, 1938.  E. S. HINELINE  2,107,074
COPYING CAMERA EQUIPMENT UNIT
Filed Jan. 23, 1937   7 Sheets-Sheet 3
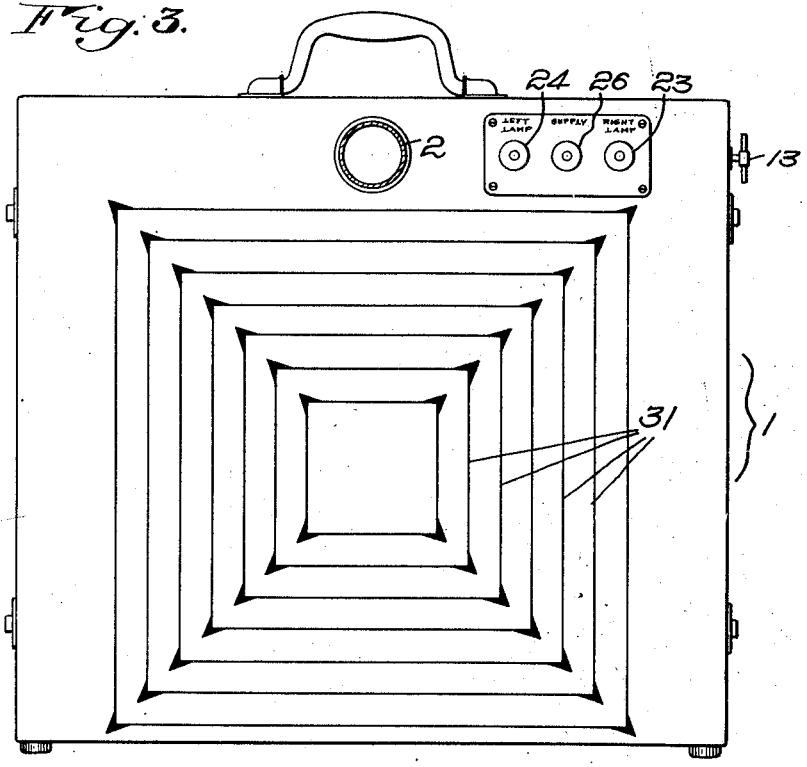
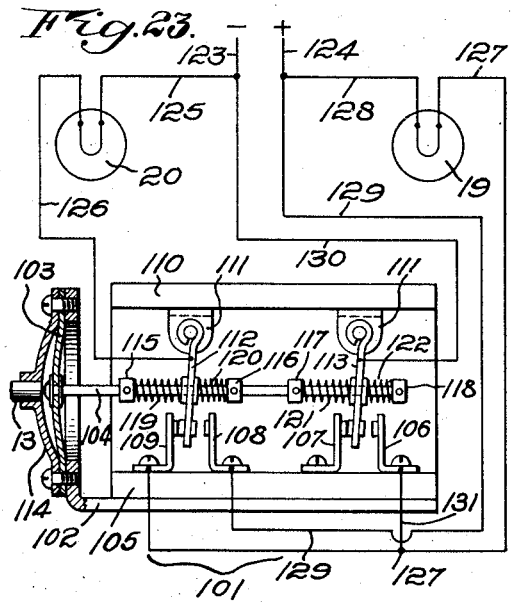
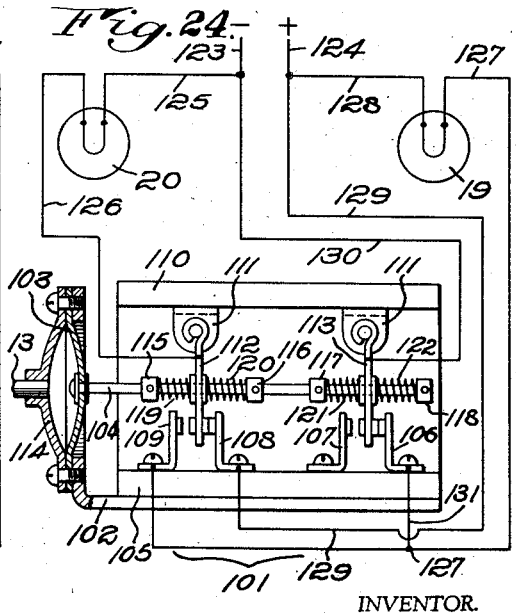
INVENTOR.
Edson S. Hineline
BY Emery Booth Townsend Miller & Werdner
his ATTORNEYS

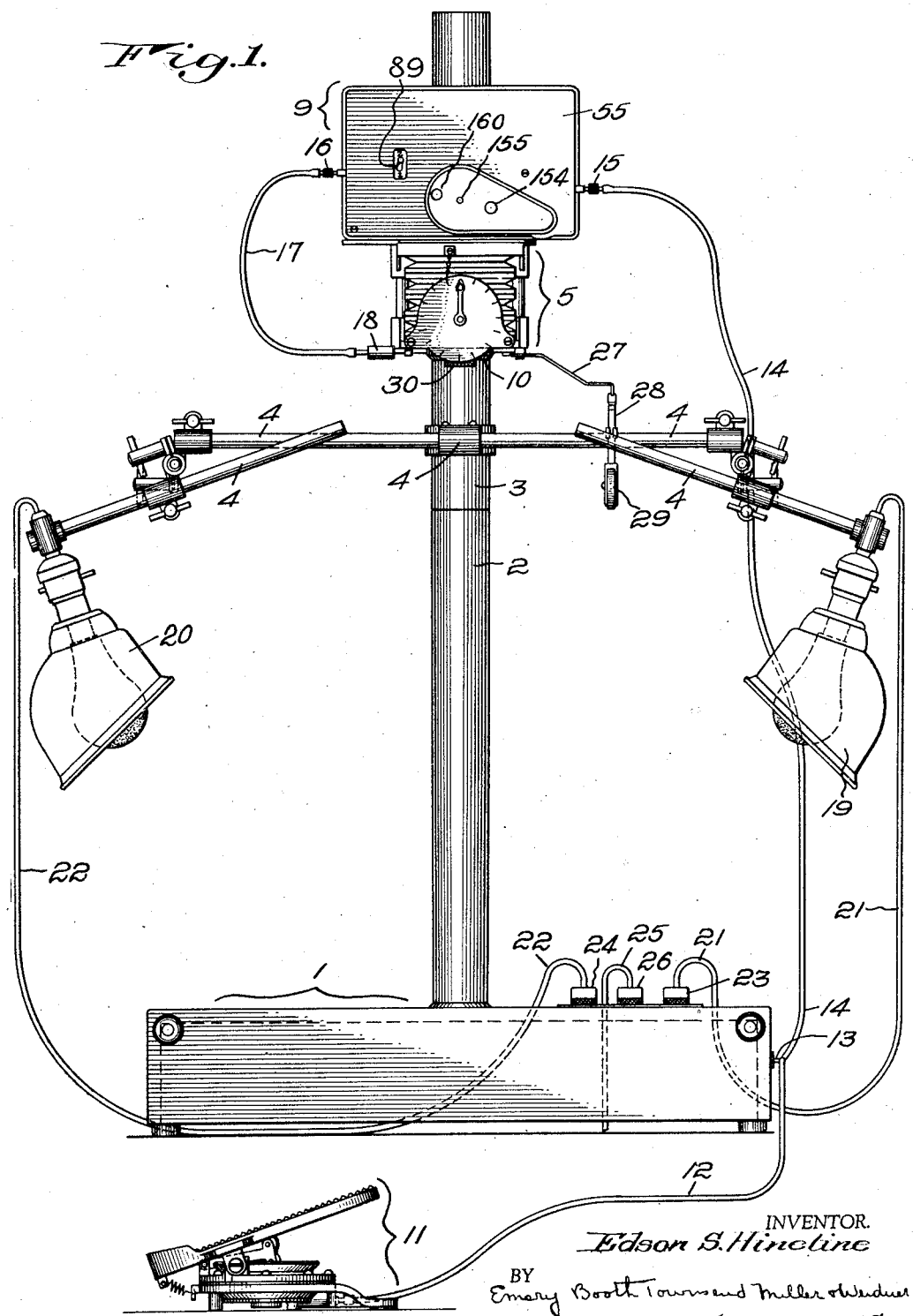

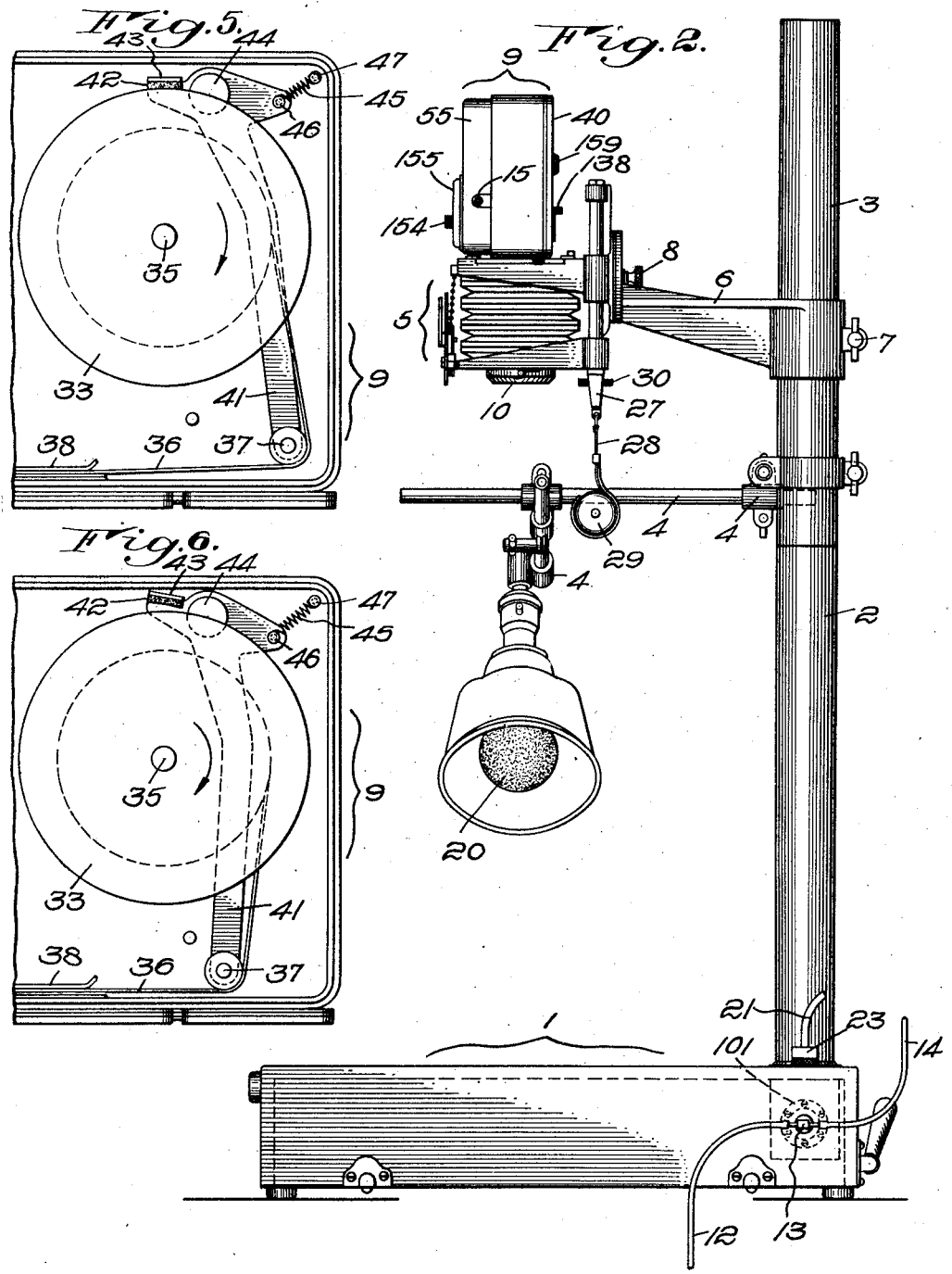

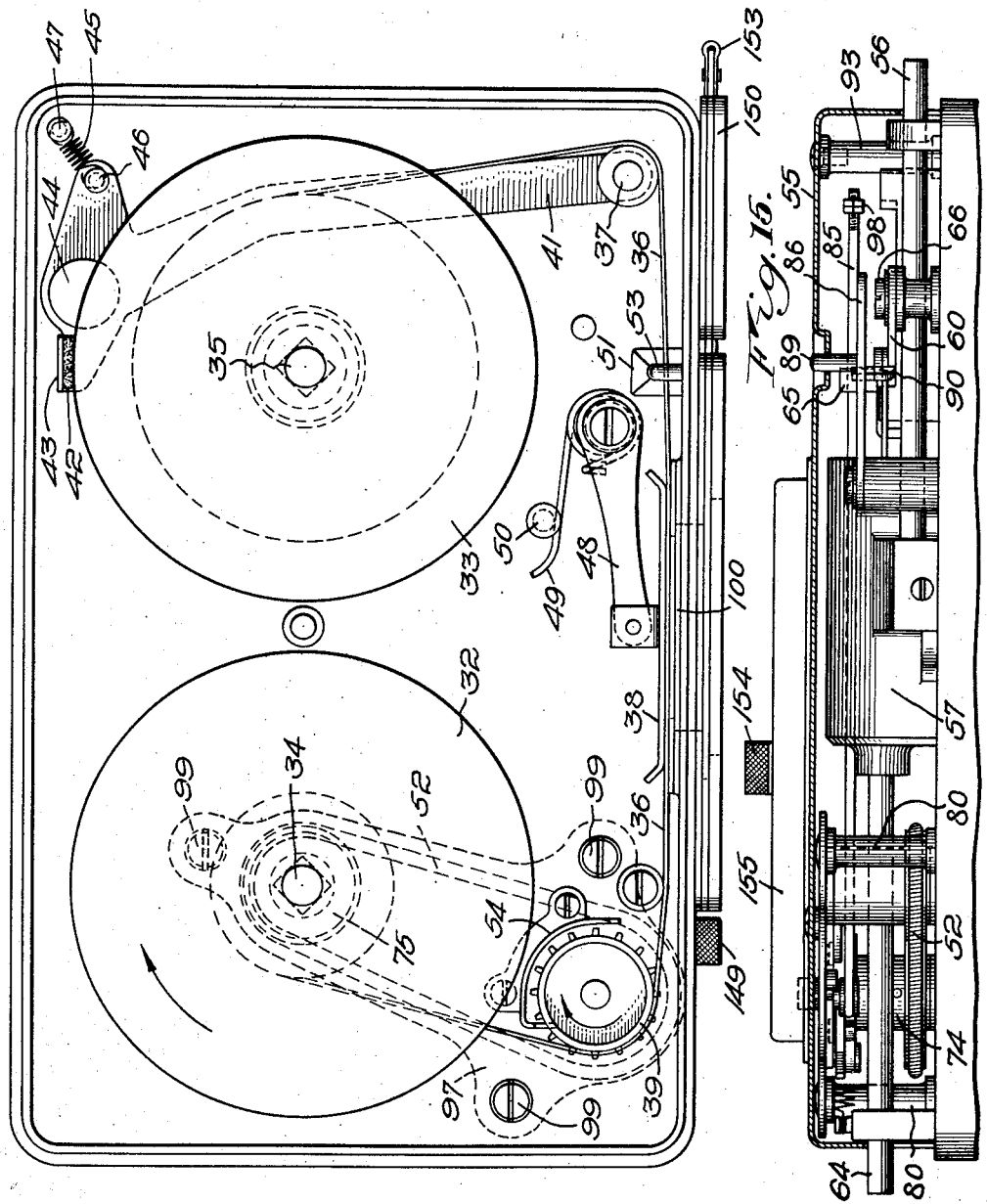

Feb. 1, 1938. E. S. HINELINE 2,107,074
COPYING CAMERA EQUIPMENT UNIT
Filed Jan. 23, 1937 7 Sheets-Sheet 5
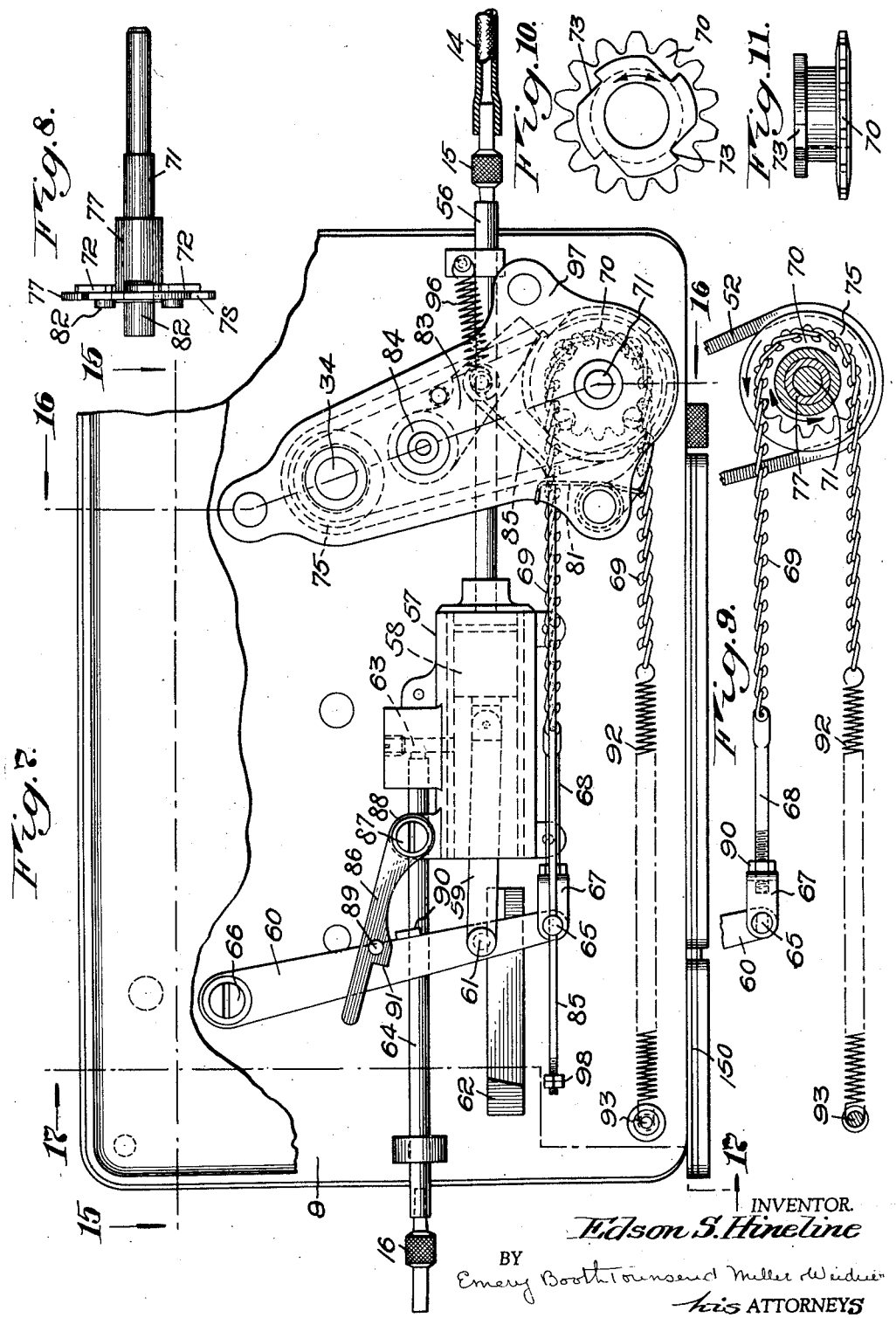
INVENTOR.
Edson S. Hineline
BY Emery Booth Townsend Miller Widdicum
his ATTORNEYS

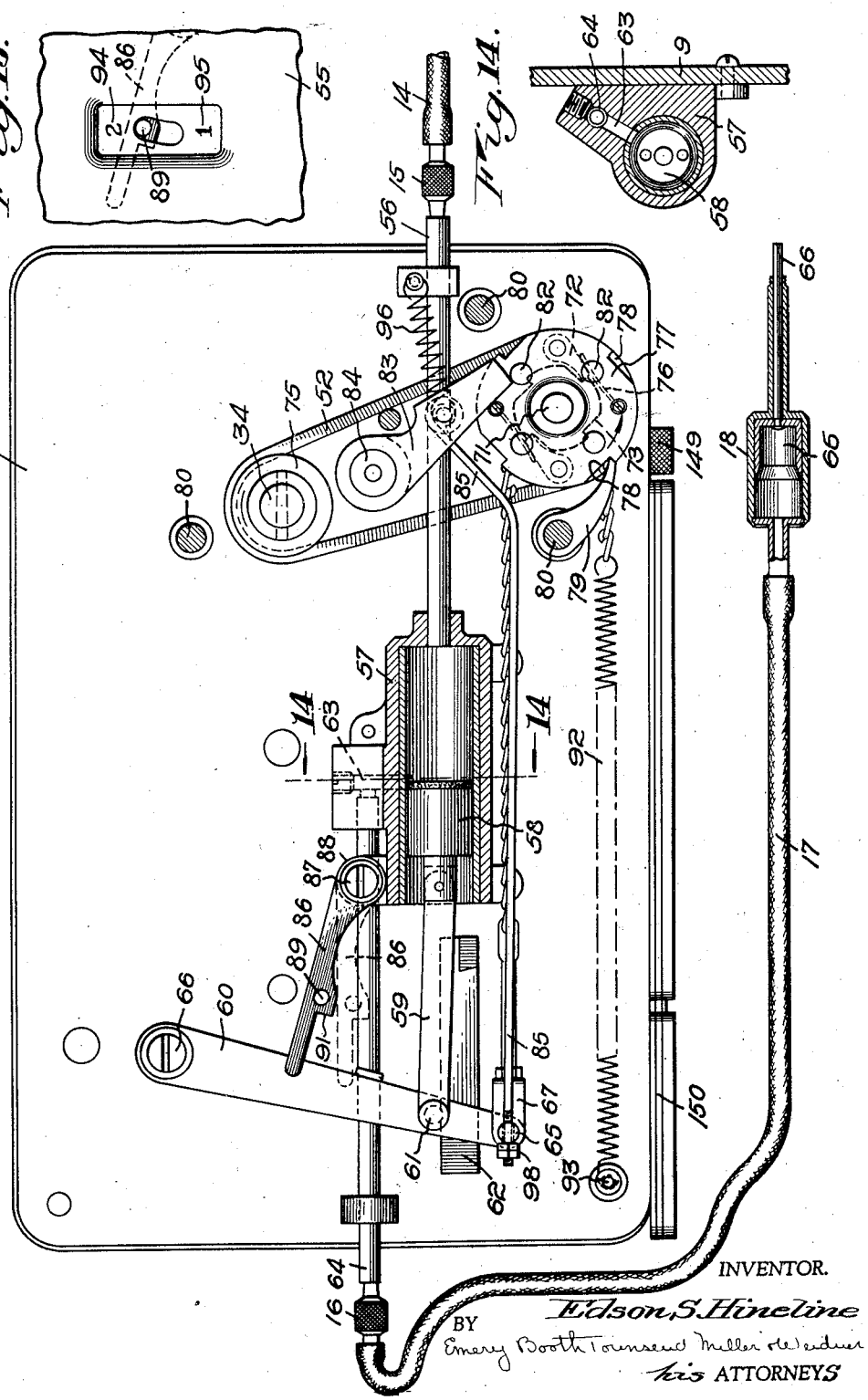

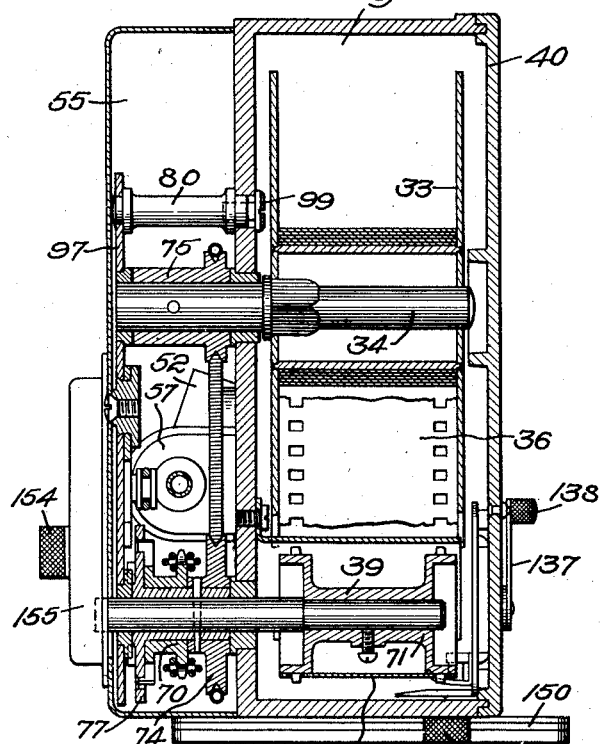
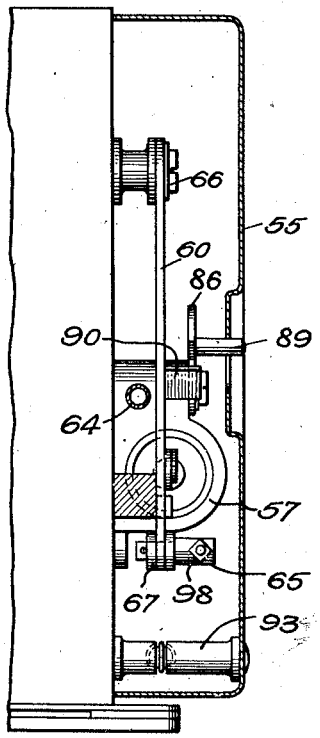
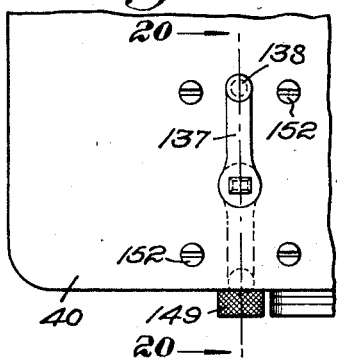
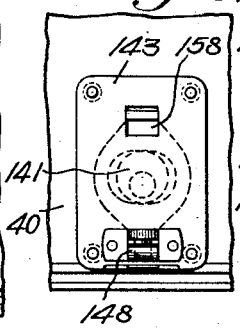
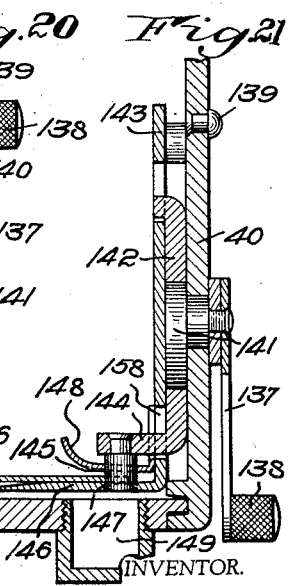
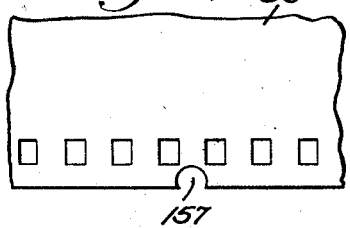

Patented Feb. 1, 1938

2,107,074

UNITED STATES PATENT OFFICE 2,107,074

COPYING CAMERA EQUIPMENT UNIT

Edson S. Hineline, Rochester, N. Y., assignor to The Folmer Graflex Corporation, Rochester, N. Y., a corporation of Delaware Application January 23, 1937, Serial No. 122,018

19 Claims. (Cl. 88—24)

This invention relates to means for making photographic records or photographic copies with great rapidity and at low cost, and is an improvement upon the construction shown in my co-pending application Ser. No. 35,612, filed August 10, 1935, now Patent No. 2,069,186, dated January 26, 1937.

In order that the principle of the invention may be readily understood, I have disclosed a single embodiment of the invention in the accompanying drawings, wherein—

Fig. 1 is a front elevation of the complete outfit assembled and ready for use;

Fig. 2 is a right hand side elevation of the outfit with the right hand lamp removed;

Fig. 3 is a top plan view of the case which forms the platen, showing the arrangement of various parts;

Fig. 4 is a top plan view of the magazine with the cover removed and the film in place;

Fig. 5 is a detail in longitudinal section, viewing Fig. 4, of the film spool feeding mechanism;

Fig. 6 is a detail showing some of said parts in a different arrangement;

Fig. 7 is a front elevation of the magazine with the cover partly broken away showing the arrangement of the various parts used for feeding the film and operating the shutter;

Fig. 8 is a detail of the film sprocket shaft and ratchet disk;

Fig. 9 is a detail in front elevation and vertical section of the chain operating mechanism;

Fig. 10 is a detail of the sprocket and cam assembly;

Fig. 11 is a plan view of Fig. 10;

Fig. 12 is a view of the front of the magazine with the magazine cover and part of the mechanism removed and the air cylinder sectioned to show clearly the relation of the various parts;

Fig. 13 is a detail of the magazine mechanism cover showing the relation of the frame changing device;

Fig. 14 is a section of cylinder shown in Fig. 12 on the line 14—14;

Fig. 15 is a section of Fig. 7 on the line 15—15 showing the arrangement of certain parts of the mechanism;

Fig. 16 is a section of Fig. 7 on the line 16—16;

Fig. 17 is a partial section of Fig. 7 on line 17—17;

Fig. 18 is a portion of the magazine showing the notching device handle;

Fig. 19 is a detail showing the arrangement of parts of the notching device;

Fig. 20 is a vertical section through the notching device on line 20—20 to show clearly the relation of parts;

Fig. 21 is a like view with the parts in a different position;

Fig. 22 is an enlarged section of film showing the edge notch;

Fig. 23 illustrates the pneumatic switch and the circuit diagram, in which position the two lamps are in series; and Fig. 24 shows the same switch and diagram when pressure has been applied on the diaphragm and the switch is in the position for operating the lamps in parallel with the current source.

Before proceeding with the detailed description, I desire to state that this invention has further uses in making a series of photographic records, such as through a microscope or photographing recording meter, or it can be used as an identification camera for photographing a large number of persons in a very short time. Although there are a number of different single purpose cameras of this general type, I believe this disclosure and that of my said co-pending application (now patented) to be the first development of a camera which has as large a number of uses, without in any way impairing its operation or functions for any one of these various uses. It is self-contained in that it can be packed in its case which forms a base when in operation. The switching mechanism for the lamp is a permanent part of this base and is controlled pneumatically through a fixed source of compressed air or through a special foot pump of the bellows type or any other convenient source of compressed air or gas.

The film is traversed across the picture taking aperture, and the shutter is operated by the same source of compressed air or gas. A number of these cameras can be connected in parallel and operated in synchronism for time study or other record making purposes.

The camera is equipped with a detachable magazine so that various magazines may be used for different film widths or for different types of sensitized material. The camera can also be operated with the standard plate holders or plate magazines or film packs. The camera is so constructed that it can be swung on its supporting bracket through 180 degrees or around the column 360 degrees, thus making the camera available for almost any type of photography, since the lights can also be positioned in almost any direction to provide adequate illumination for the subject being photographed.

This camera outfit is particularly suitable for scientific study and laboratory research work, having all the necessary components for this work.

Some of the features of this invention have been disclosed in my said co-pending application, now Patent No. 2,069,186. However, this application contains greatly improved features making the field of operation for this camera very much greater, and also contributing to the ease of operation. Through the use of the pneumatic control, it is possible to have both hands free at all times for the manipulation of the objects being photographed. This has proved to be a very great advantage.

In Fig. 1 the camera is shown completely assembled on a base 1 which is made up in two parts, one part only being shown. The two combined form a case to receive all of the parts for the outfit when packed for transportation. Fastened to case 1 with a quick detachable joint is a column post made up of parts 2 and 3. Attached to the column post is a lamp assembly designated broadly as 4. The camera 5 is carried on a bracket 6, clearly shown in Fig. 2, and it has a clamp screw 7 allowing the bracket 6 to move up and down the column or swing around the column and permitting the camera to be used in almost any position. The camera 5 is clamped to the bracket 6 with a screw 8, which is loosened by turning to the left. The camera can be rotated through 180 degrees, thus allowing the camera to be pointed in any direction. To the camera 5 is attached a magazine 9 and a shutter 10. The term "magazine" as employed in the specification and claims, and as indicated in Figs. 1 and 2, includes both the part that contains the film with its take-up and take off spool, etc. and also the part that contains the operating mechanism for the film. A foot operated pump 11, Fig. 1, is attached to a fitting 13 on case 1 through hose 12. The fitting 13 is a T type fitting, clearly shown in Figs. 2 and 3. A hose is connected to the oposite end of the fitting 13, and through hose 14 and coupling 15 air is carried to the magazine operating mechanism.

Air is carried from the operating mechanism through a fitting 16 and hose 17 to the shutter cylinder 18 for operating the shutter. The camera has a focusing means similar to the one disclosed in my co-pending application (now patented) above referred to.

The lamp bracket assembly 4 carries lamps 19 and 20 connected through cords 21, 22 to the switch mechanism through plugs 23, 24. Current supply is fed to switch mechanism through the wire 25 and plug 26. Suspended from the lower portion of the camera 5 is an arm 27 which carries a tape 28 similar to a steel rule tape which is rolled up in housing 29.

When the housing 29 is brought downward and the tape 28 is extended and arm 27 is swung around in position under the lens 30, the case 29 acts as a plumb bob for centering material while being photographed and locating the camera at the proper distance from the base.

Fig. 3 is a top plan view of the case as it appears with the column 2 cut off, clearly showing the placement of plugs 23, 24 and 26 and the T air connection 13. The base 1 is ruled with lines 31 and graduated for reducing the size of the photograph, as, for instance, four times, six times, etc.

Fig. 4 is, as previously stated, a front elevation of the magazine with cover 40 removed showing the placement of the take-up spool 32 and take-off spool 33 mounted on spool stud 35 and spool shaft 34. The film 36 is led from spool 33 under roller 37, under pressure pad 38, around sprocket wheel 39 onto spool 32. Since this magazine is operated pneumatically and the impulse which is converted into a rotary motion through sprocket 29 and shaft 11, and as this motion is quite rapid, it becomes necessary to provide some means of relieving the strain that would be imposed upon film 36 when sprocket wheel 39 is turned in the direction of the arrow. It is also necessary to keep the spool 33 from running freely or over-running when no film is being drawn from spool 33. This I accomplish by providing the spool 33 with a brake 41 which carries a pad 42 of leather or some other such material, fastened to the brake 41 at 43. The brake 41 is pivoted on a stud 44 and is caused to be rotated in such a direction as to apply the brake on spool 33 by spring 45 which is hooked over stud 46 and stud 47. When sprocket wheel 39 is caused to rotate in the direction of the arrow, the film is drawn under pressure pad 38, which is held in contact with the exposure opening 100 in the magazine, shown in dotted lines, through arm 48 and spring 49, and hooked over the stud 50. The film is guided through a boss 51 and a pin 53 in the magazine casting. The film is then pulled over roller 37, causing roller 37 to advance in the direction of film travel, as clearly shown in Fig. 6. This spring load is very light, and requires very little power to set the brake or brake arm 41 in motion. When this takes place, the pad 42 is lifted from the rim of spool 33, allowing spool 33 to rotate in the direction of the arrow, thus feeding a supply of film. This feeding continues even after sprocket 39 has stopped rotating until roller 37 carried by brake arm 41 returns to the position shown clearly in Fig. 5. This again applies the brake on spool 33 through pad 42. It will be seen that it is not necessary to start the spool 33 immediately rotating when the film starts to move, and that the spool continues to move after the film motion is stopped. This action allows a measured amount of film to be released from spool 33 and at the same time it is kept taut over the exposure opening under pressure pad 38, thus absorbing all shock on film 36 at sprocket 39.

The film then is caused to be taken up on spool 32 through a spring belt 52, shown in dotted lines in Fig. 4 and also clearly shown in Fig. 12. The film 36 is kept from following around sprocket wheel 39 by a guard 54, thus preventing the film from being tangled when feeding through the magazine.

Fig. 7 is a view of the front of the magazine. The cover 55 and which is at the opposite side of the magazine from the cover 40 thereof, is shown as partly cut away to disclose the operating mechanism. Air is supplied through hose 14 and coupling 15 to the tube 56, thence to cylinder 57, forcing piston 58 to move forward, carrying connecting rod 59 and arm 60 through pin 61 to position against stop 62, as shown in Fig. 12.

When the piston 58 is in this position, it uncovers port 63 and allows air to flow through tube 64, connection 16, hose 17 to shutter cylinder 18, driving piston 65 to the position shown in Fig. 12. Riveted to piston 65 is a piston rod 66 which is caused to operate the shutter in a conventional manner. Passages 63 and 64 in the cylinder are clearly shown in Fig. 14, which, as previously stated, is a section of the cylinder taken on the line 14—14, Fig. 12.

The movement of arm 60 above referred to, carries with it clevis 67, clevis rod 68 and chain 69, causing sprocket wheel 70, shown in dotted lines in Fig. 12 and also clearly in Fig. 10, to be rotated in a counterclockwise direction. Sprocket wheel 70 is carried on shaft 71 and is free to rotate thereon. On shaft 71 is also carried a ratchet disk and hub 77 which is keyed to shaft 71. Ratchet disk 77 also carries pawls 72, 72 which are urged inward by springs 76. Pawls 72 override ratchet portion 74 which is made a part of sprocket wheel 70. When the sprocket wheel 70 is caused to rotate through motion of chain 69 in a counterclockwise direction, pawls 72 drop into notches of ratchet 73, driving disk 77 and shaft 71 and film sprocket 39 in a clockwise direction, as viewed in Figs. 7 and 12, thus causing the film strip 36 to be carried past the exposure opening 100.

The attachment of sprocket 39 to shaft 71 is clearly shown in Fig. 16, being clamped to shaft 71 with screw 95. Shaft 71 also carries a V grooved pulley 74 which is pinned to shaft 71. A spring belt 52 passes over pulley 74 and over pulley 75, which is keyed to shaft 34 and causes shaft 34 to be rotated to take up the film 36 on spool 33. On ratchet disk 77 (Figs. 8 and 12) are clearly shown ratchet teeth 78.

A pawl 79 is carried on stud 80 and held in contact with disk 77 through a spring 81, shown in dotted lines in Fig. 7. This prevents shaft 71 from rotating in a clockwise direction. Thus, through the combination of the two ratchets just described, a unidirectional motion to shaft 71 is caused, regardless of the direction of the movement of sprocket 70 and chain 69. The normal operation of chain 69 is forward and backward caused by the outward movement of piston 58 and the return movement of piston 58 through connecting rod 59, arm 60, link 68, chain 69 and spring 92.

To prevent over-running of shaft 71 and film sprocket wheel 39, the disk 77 carries four pins 82, as clearly shown in Fig. 12. The pawl 83 supported on stud 84 is caused to travel forward with arm 60 through rod 85, nuts 98, clevis pin 65, passing in front of pin 82 at the time piston 58 reaches the end of the stroke, or as shown in Fig. 12. The pawl 83 is shown in dotted lines in Fig. 7, when the piston has returned to its starting position, whereupon pawl 83 is caused through spring 96 to clear pin 82, allowing disk 77 to make either a half revolution or a full revolution depending on the position of a retarding member 86. The retarding member 86 is carried on the cylinder casting with a shoulder screw 87 held in position by a spring washer 88. Attached to the retarding member 86 is a pin 89 which protrudes through the cover 55 to allow the movement of the retarding member to the position shown in Fig. 12. The lever 60 is provided with an up-turned part 90 which contacts a lip 91 when the lever 60 moves toward the starting position, when member 86 is in the position shown in dotted lines in Fig. 12, thus allowing the mechanism to make a quarter revolution instead of a half revolution as just outlined. The chain 69 is caused to return to the starting position by spring 92 hooked over pin 93, thus carrying sprocket 70 with it in a clockwise direction.

Since the ratchet teeth 73 are so constructed that pawls 72 will ride over the ratchet teeth in this direction, no movement is imparted to the shaft 71 and sprocket 39. The rod 68 is provided with a threaded portion 94 and a nut 95 to adjust its relative position with respect to clevis 67. When air has been admitted to the cylinder 57 through hose 14, etc., and piston 58 has been caused to move forward, as in Fig. 12, uncovering port 63, this allows air to flow to cylinder 18, causing piston 65 to move piston rod 66 forward, thus operating the shutter and moving the film forward. However, the shutter does not operate until the film has moved all the way forward and the mechanism for moving the film has come to rest, as the port 63 is not uncovered until this position is reached. Upon releasing the air pressure from the system, which might be done with a valve or the releasing of the foot from the bellows type pump 11, air is exhausted from cylinder 57, and arm 60 is caused to return through pressure applied by spring 92, carrying with it the chain 69, rod 68, clevis 67, arm 60 and connecting link 59. The piston 65 is so fitted in cylinder 18 that there is a slow bleeding of air past the piston 65, which allows piston rod 66 to be returned by the shutter spring (not shown, this being a part of the conventional shutter) to the starting position, thus allowing the shutter mechanism to reset for the next cycle. This is a function of the conventional shutter. The shaft 34 and shaft 71 are carried by the plate 97 and studs 98, and are held to the magazine with screws 99.

Fig. 13 is a detail of the mechanism cover showing lever 86 in dotted lines and showing at 94, 95 two numerals 1 and 2. When pin 86 is in the No. 2 position, a half revolution of shaft 71 takes place, and when in the No. 1 position a quarter revolution of shaft 71 takes place.

To make photographs it is necessary to cause the lamps 19 and 20 to become illuminated, so as to illuminate the object to be photographed. To get very intense illumination so-called photoflood lamps are used, which have a rather short life if left burning at full brilliancy. Therefore, to prolong the life of the lamps I connect these lamps in parallel across the line only while exposure is being made and the shutter is open, and at other times the two lamps are burning in series, thus applying half the voltage to each lamp, prolonging their life to a great extent. This is accomplished through a pneumatically operated switch 101, shown clearly in Figs. 23 and 24, in which the part 102 is a metal frame supporting a diaphragm 103 and an air chamber cover 104. To this air chamber cover 104 the T fitting 13, previously referred to, is attached. In said metal support 102 is carried an insulating block 105 and four contact members 106, 107, 108, and 109. Also in the upper portion of the support 102 is carried a second insulating block 110 which carries brackets 111 and pivoted arms 112 and 113. To the diaphragm 103 is attached a rod 114 which carries collars 115, 116, 117, 118, which are keyed to the rod 114. Between said collars 115 and 116 are placed springs 119 and 120. Between collars 117 and 118 and arm 113 are placed springs 121 and 122.

In Fig. 23, the switch is shown in its normal position, closing contacts on arm 112, 109 and on arm 113 and 107. Current is applied to wires 123 and 124. The current then will flow through wire 125, lamp 20 and wire 126, contact arm 112, contact 109 and wire 127 to lamp 19 and wire 128 and back to wire 124, thus completing the circuit, placing lamps in series connection. This is the rest position.

When air is applied through the fitting 13, the diaphragm 103 is caused to move forward carrying with it rod 114, collar 115, compressing spring 119, causing arm 112 to move forward, closing contacts between 112 and 108 and opening contacts between 112 and 109. This also carries collar 117, spring 121 and arm 113, closing contacts 113 and 106. Current will flow through wire 123, 125, lamp 20, wire 126, contact arm 112, contact 108, wire 129, back to wire 124. This places the lamp directly across the line or parallel therewith. Current will also flow through wire 130, contact arm 113, contact 106, wire 131, wire 127, lamp 19, wire 128, back to wire 124. This also places the lamp in parallel with the line source, which causes it to burn at full brilliancy.

It will be seen that each time a supply of air is furnished to fitting 113 through a foot pump or through a valve on the supply line, the diaphragm 103 will be caused to move forward, completing the connections just described. When air is released, the diaphragm 103 will return, again placing the lamps in their normal position or in a series connection.

I have described and shown a mechanical type of switch, but other types of switches could be used, as, for instance, mercury or solenoid operated switches or anything that would function upon the application of air or gas supply.

It becomes necessary, when making photographs of a number of different subjects, to be able to mark in some way the commencement and the end of these various subjects, so that the film may be cut apart for development, prior to the use of the complete roll of film. To accomplish this I provide mechanism which is placed on the cover 40 of the magazine, and it is shown in detail in Figs. 18, 19, 20, and 21. Fig. 22 shows the appearance of the film after it has been notched. In Fig. 20, the cover of the magazine is indicated at 40 and at 137 is shown an arm that can be caused to rotate through the handle 138. This handle is held in position through a stud 139 fitted into a recess 140 of handle 138. To this handle is fastened a cam 141 which turns in a hole in the cover 40. Overriding this cam is a member 142 which slides up and down in grooves 158 in plate 143, Fig. 19. The lower end of the member 142 has a bent-out portion 144 carrying a punch 145. The lower end of plate 143 is also bent out, as shown at 146, and has a hole 147. Over this hole is placed a guide strip or stripper 148. The film 36 passes between the guide strip 148 and bent-out portion 146. When the lever arm 137 is turned into the position shown in Fig. 21, the punch 145 is caused to pierce the film 36 and enter the hole 147, thus perforating the film as shown at 151, Fig. 22. Below the hole 147 is placed a cup 149 which screws into the magazine case to catch the chips from the film. After the notch 157 is punched in the film, the handle or knob 138 is again returned to position as shown in Figs. 20 and 18. This entire mechanism is carried on the cover 40 and is removed with it when the cover is removed for placing the film in the magazine, by removing the screw 159 as shown in Fig. 2.

The plate 143 is held to the cover 40 with a stud 151 riveted to the plate 143 and fastened to the cover 40 with screws 152.

The magazine 9 has an adapter plate 150 which is actually made up of several plates to allow a dark slide 153 to be used when the magazine is removed from the camera. This structure is substantially the same as shown in my said application (now patented).

Mounted on the magazine cover 55 is a counter device (see Fig. 1) used for counting the number of exposures. The number of the exposure can be seen through the window 160. The reset knob 154 is used to reset the counter to zero.

Having thus described one illustrative embodiment of the invention, it is to be understood that although specific terms are employed, they are used in a generic and descriptive sense and not for purposes of limitation, the scope of the invention being set forth in the following claims.

I claim:

1. In mechanism for rapidly making photographic records and the like, an equipment unit including a camera and a magazine, said camera having a shutter and lens, and the magazine having therein pneumatic film feeding means; said unit including means to support the camera and magazine upon a basal formation in spaced, definite relation with respect to said records or the like, means mounting said camera and magazine to turn them upon the support through a wide arc toward and from the basal point of said support; and a manual-power, elongated, transmission member extending exteriorly of the camera and magazine, constituting a part of said unit, and adapted to have manual power applied thereto in a series of separate impulses of unlimited number and to transmit such manual power by each of said impulses to the film feeding means and shutter thereby to operate the film feeding means and shutter in any of said positions upon its support and in so doing conveying operating air into the magazine to the said pneumatic film operating means in the said magazine.

2. In mechanism for rapidly making photographic records and the like, an equipment unit including a camera and a magazine, said camera having a shutter and lens, and the magazine having therein pneumatic film feeding means, said unit also including means to support the camera and magazine upon a basal formation in spaced, definite relation with respect to said records or the like, and a manual-power, elongated, transmission member extending exteriorly of the camera and magazine, and constituting a part of said unit, and adapted to have manual power applied thereto in a series of separate impulses of unlimited number and to transmit such manual power by each of said impulses to the film feeding means and shutter thereby conveying operating air into the magazine to the said pneumatic film operating means in the said magazine, said power transmission member being so constructed and arranged that it leaves both hands of the operator free at substantially all times for the manipulation of the objects being photographed upon said basal formation.

3. In mechanism for rapidly making photographic records and the like, an equipment unit including a camera and a magazine, said camera having a shutter and lens and the magazine having therein pneumatic film feeding means, said unit also including means to support the camera and magazine upon a basal formation in spaced, definite relation with respect to said records or the like, and a manual-power, elongated, transmission member extending exteriorly of the camera and magazine, and constituting a part of said unit, and adapted to have manual power applied thereto in a series of separate impulses of unlimited number and to transmit such manual power by each of said impulses to the film feeding means and shutter, said elongated transmission member including means to convey operating air into the magazine to the said pneumatic film operating means located in the magazine.

4. In mechanism for rapidly making photographic records and the like, an equipment unit including a camera and a magazine, said camera having a shutter and lens and the magazine having therein film feeding means, said unit also including means to support the camera and magazine upon a basal formation in spaced, definite relation with respect to said records or the like, said parts so supported in definite spaced relation from a basal formation having plumb-bob means connected thereto for centering and properly positioning said parts with respect to said basal formation, together with a manual-power, elongated, transmission member extending exteriorly of the camera and magazine, and constituting a part of said unit, and adapted to have manual power applied thereto in a series of separate impulses of unlimited number and to transmit such manual power by each of said impulses to the film feeding means and shutter.

5. In mechanism for rapidly making photographic records and the like, an equipment unit including a camera and a magazine, said camera having a shutter and lens, and the magazine having therein pneumatic film feeding means, said unit also including means to support the camera and magazine upon a basal formation in spaced, definite relation with respect to said records or the like, and a manual-power, elongated, transmission member extending exteriorly of the camera and magazine, and constituting a part of said unit, and adapted to have manual power applied thereto in a series of separate impulses of unlimited number and to transmit such manual power by each of said impulses to the said pneumatic film feeding means within the magazine and also to said shutter.

6. In mechanism for rapidly making photographic records and the like, an equipment unit including a camera and a magazine, said camera having a shutter and lens, and the magazine having therein pneumatic film feeding means, said unit also including means to support the camera and magazine upon a basal formation in spaced, definite relation with respect to said records or the like, and a manual-power, elongated, transmission member extending exteriorly of the camera and magazine, and constituting a part of said unit, and adapted to have manual power applied thereto in a series of separate impulses of unlimited number and to transmit such manual power by each of said impulses to the said pneumatic film feeding means within the magazine and also to said shutter, and means cooperatively related to said transmission member for relieving strain upon the film resulting from said pneumatic film-feeding action.

7. In mechanism for rapidly making photographic records and the like, an equipment unit including a camera and a magazine, said camera having a shutter and lens, and the magazine having therein pneumatic film feeding means; said unit also including means to support the camera and magazine upon a basal formation in spaced, definite relation with respect to said records or the like, and a manual-power, elongated, transmission member extending exteriorly of the camera and magazine, and constituting a part of said unit, and adapted to have manual power applied thereto in a series of separate impulses of unlimited number and to transmit such manual power by each of said impulses to the said pneumatic film feeding means within the magazine and also to said shutter, and brake means operatively associated with the film and rendered operable when no film is being drawn.

8. In mechanism for rapidly making photographic records and the like, an equipment unit including a camera and a magazine, said camera having a shutter and lens, and the magazine having therein pneumatic film feeding means, said unit also including means to support the camera and magazine upon a basal formation in spaced, definite relation with respect to said records or the like, and a manual-power, elongated, transmission member extending exteriorly of the camera and magazine, and constituting a part of said unit and adapted to have manual power applied thereto in a series of separate impulses of unlimited number and to transmit such manual power by each of said impulses to the said pneumatic film feeding means within the magazine and also to said shutter, said pneumatic film feeding means including a feeding roll and a brake operatively associated with said film and constructed to engage the said feeding roll intermittently.

9. In mechanism for rapidly making photographic records and the like, an equipment unit including a camera and a magazine, said camera having a shutter and lens, and the magazine having therein pneumatic film feeding means, said unit also including means to support the camera and magazine upon a basal formation in spaced, definite relation with respect to said records or the like, and a manual-power, elongated, transmission member extending exteriorly of the camera and magazine, and constituting a part of said unit, and adapted to have manual power applied thereto in a series of separate impulses of unlimited number and to transmit such manual power by each of said impulses to the said pneumatic film feeding means within the magazine and also to said shutter, said pneumatic film feeding means including take-off spool or roller 33 and a brake member 41 to engage intermittently with said spool or roller.

10. In mechanism for rapidly making photographic records and the like, an equipment unit including a camera and a magazine, said camera having a shutter and lens, and the magazine having therein pneumatic film feeding means, said unit also including means to support the camera and magazine upon a basal formation in spaced, definite relation with respect to said records or the like, and a manual-power, elongated, transmission member extending exteriorly of the camera and magazine, and constituting a part of said unit, and adapted to have manual power applied thereto in a series of separate impulses of unlimited number and to transmit such manual power by each of said impulses to the said pneumatic feeding means within the magazine and also to said shutter, said pneumatic feeding means including a pneumatic cylinder and piston both located within the magazine and operated by said manual-power means.

11. In mechanism for rapidly making photographic records and the like, an equipment unit including a camera and a magazine, said camera having a shutter and lens, and the magazine having therein pneumatic film feeding means, said unit also including means to support the camera and magazine upon a basal formation in spaced, definite relation with respect to said records or the like, and a manual-power, elongated, transmission member extending exteriorly of the camera and magazine, and constituting a part of said unit, and adapted to have manual power applied thereto in a series of separate impulses of unlimited number and to transmit such manual power by each of said impulses to the said pneumatic film feeding means within the magazine and also to said shutter, said pneumatic film feeding means including a pneumatic cylinder and piston both located within the magazine and operated by said manual-power means, and operative connections from said piston to said shutter.

12. In mechanism for rapidly making photographic records and the like, an equipment unit including a camera and a magazine, said camera having a shutter and lens, and the magazine having therein pneumatic film feeding means, said unit also including means to support the camera and magazine upon a basal formation in spaced, definite relation with respect to said records or the like, and a manual-power, elongated, transmission member extending exteriorly of the camera and magazine, and constituting a part of said unit, and adapted to have manual power applied thereto in a series of separate impulses of unlimited number and to transmit such manual power by each of said impulses to the said pneumatic film feeding means within the magazine and also to said shutter, and means for pneumatically operating said film feeding means, said pneumatic film operating means including a motion-transmitting shaft 71, and means to impart a unidirectional motion to shaft 71 at all times of movement thereof.

13. In mechanism for rapidly making photographic records and the like, an equipment unit including a camera and a magazine, said camera having a shutter and lens, and the magazine having therein pneumatic film feeding means, said unit also including means to support the camera and magazine upon a basal formation in spaced, definite relation with respect to said records or the like, and a manual-power, elongated, transmission member extending exteriorly of the camera and magazine, and constituting a part of said unit, and adapted to have manual power applied thereto in a series of separate impulses of unlimited number and to transmit such manual power by each of said impulses to the said pneumatic film feeding means within the magazine and also to said shutter, and means for pneumatically operating said film feeding means, said pneumatic film operating means including a motion-transmitting shaft 71 and operatively associated means to prevent overrunning thereof, including a disk 77 having a series of spaced pins.

14. In mechanism for rapidly making photographic records and the like, an equipment unit including a camera and a magazine, said camera having a shutter and lens, and the magazine having therein pneumatic film feeding means, said unit also including means to support the camera and magazine upon a basal formation in spaced, definite relation with respect to said records or the like, and a manual-power, elongated, transmission member extending exteriorly of the camera and magazine, and constituting a part of said unit, and adapted to have manual power applied thereto in a series of separate impulses of unlimited number and to transmit such manual power by each of said impulses to the said pneumatic film feeding means within the magazine and also to said shutter, and means for pneumatically operating said film feeding means, said pneumatic film feeding means including pneumatic cylinder 18, a piston 65 therein, a piston rod 66 connected to the piston and connections from said piston rod to a film-contacting portion of the film feeding means and to the shutter.

15. In mechanism for rapidly making photographic records and the like, an equipment unit including a camera and a magazine, said camera having a shutter and lens, and the magazine having therein pneumatic film feeding means, said unit also including means to support the camera and magazine upon a basal formation in spaced, definite relation with respect to said records or the like, and a manual-power, elongated, transmission member extending exteriorly of the camera and magazine, and constituting a part of said unit, and adapted to have manual power applied thereto in a series of separate impulses of unlimited number and to transmit such manual power by each of said impulses to the said pneumatic film feeding means within the magazine and also to said shutter, and means for pneumatically operating said film feeding means, said pneumatic film feeding means including pneumatic cylinder 18, a piston 65 therein, a piston rod 66 connected to the piston and connections from said piston rod to a film-contacting portion of the film feeding means and to the shutter, and cooperating means constructed to allow the shutter mechanism to reset for the next cycle.

16. In mechanism for rapidly making photographic records and the like, an equipment unit including a camera and a magazine, said camera having a shutter and lens, and the magazine having therein film feeding means, said unit also including means to support the camera and magazine upon a basal formation in spaced definite relation with respect to said records or the like, and a manual-power, elongated, transmission member extending exteriorly of the camera and magazine, and constituting a part of said unit, and adapted to have manual power applied thereto in a series of separate impulses of unlimited number and to transmit such manual power by each of said impulses to the film feeding means and shutter, said equipment unit including an electric lamp carried by the said means to support the camera and magazine, and means operatively connected to and controlled by said film feeding means for connecting said lamp in parallel while an exposure is being made and the shutter is open, and at other times in series.

17. In mechanism for rapidly making photographic records and the like, an equipment unit including a camera and a magazine, said camera having a shutter and lens, and the magazine having therein film feeding means, said unit also including means to support the camera and magazine upon a basal formation in spaced definite relation with respect to said records or the like, and a manual-power, elongated, transmission member extending exteriorly of the camera and magazine, and constituting a part of said unit, and adapted to have manual power applied thereto in a series of separate impulses of unlimited number and to transmit such manual power by each of said impulses to the film feeding means and shutter, said equipment unit including an electric lamp carried by the said means to support the camera and magazine, and means operatively connected to and controlled by said film feeding means for connecting said lamp in parallel while an exposure is being made and the shutter is open, and at other times in series, said last mentioned means including a pneumatically operated switch.

18. In mechanism for rapidly making photographic records and the like, an equipment unit including a camera and a magazine, said camera having a shutter and lens, and the magazine having therein film feeding means, said unit also including means to support the camera and magazine upon a basal formation in spaced definite relation with respect to said records or the like, and a manual-power, elongated, transmission member extending exteriorly of the camera and magazine, and constituting a part of said unit, and adapted to have manual power applied thereto in a series of separate impulses of unlimited number and to transmit such manual power by each of said impulses to the film feeding means and shutter, said equipment unit including an electric lamp carried by the said means to support the camera and magazine, and means operatively connected to and controlled by said film feeding means for connecting said lamp in parallel while an exposure is being made and the shutter is open and at other times in series, and a switch for and operatively related to said lamps for functioning upon application of air or gas supply.

19. In mechanism for rapidly making photographic records and the like, an equipment unit including a camera and a magazine, said camera having a shutter and lens, and the magazine having therein pneumatic film feeding means, said unit also including means to support the camera and magazine upon a basal formation in spaced, definite relation with respect to said records or the like, and a manual-power, elongated transmission member extending exteriorly of the camera and magazine and constituting a part of said unit and adapted to have manual power applied thereto in a series of separate impulses of unlimited number and to transmit such manual power by each of said impulses to the said pneumatic film feeding means within the magazine and also to said shutter, said equipment including an electric lamp operatively connected to and controlled by said pneumatic film feeding means as to the intensity or brilliancy of the light thereof.

EDSON S. HINELINE.